(12) United States Patent
Hickey

(10) Patent No.: US 7,342,806 B2
(45) Date of Patent: Mar. 11, 2008

(54) PORTABLE ELECTRONIC DEVICE WITH MULTIPLE INPUT INTERFACES

(75) Inventor: Kurt M. Hickey, Durham, NC (US)

(73) Assignee: Sony Ericsson Mobile Communications AB (SE)

( * ) Notice: Subject to any disclaimer, the term of this patent is extended or adjusted under 35 U.S.C. 154(b) by 509 days.

(21) Appl. No.: 10/685,188

(22) Filed: Oct. 14, 2003

(65) Prior Publication Data

US 2005/0078464 A1    Apr. 14, 2005

(51) Int. Cl.
*H01R 12/16*    (2006.01)
(52) U.S. Cl. .................. 361/790; 361/814; 361/755
(58) Field of Classification Search .............. 361/814, 361/730, 755–756, 715–716, 680
See application file for complete search history.

(56) References Cited

U.S. PATENT DOCUMENTS

| 6,038,313 | A  | * | 3/2000  | Collins ................. 379/433.07 |
| 6,297,945 | B1 | * | 10/2001 | Yamamoto ................. 361/681 |
| 6,549,789 | B1 | * | 4/2003  | Kfoury .................... 455/550.1 |
| 6,567,677 | B1 | * | 5/2003  | Sokoloff ................ 379/433.02 |
| 6,650,547 | B2 | * | 11/2003 | Hemmi et al. .............. 361/755 |
| 6,661,404 | B1 | * | 12/2003 | Sirola et al. ................ 345/168 |
| D488,453  | S  | * | 4/2004  | Chang et al. ............. D14/138 |
| 6,754,069 | B2 | * | 6/2004  | Harada ...................... 361/681 |
| 6,785,562 | B2 | * | 8/2004  | Lee et al. ................... 455/566 |
| D496,655  | S  | * | 9/2004  | Harries et al. ............. D14/247 |
| 2001/0012195 | A1 |  | 8/2001 | Loic et al. |
| 2002/0072395 | A1 | * | 6/2002 | Miramontes ............... 455/566 |
| 2003/0064685 | A1 |  | 4/2003 | Young-Se |
| 2003/0073462 | A1 |  | 4/2003 | Peter et al. |
| 2003/0078069 | A1 | * | 4/2003 | Lindeman .................. 455/550 |
| 2003/0157957 | A1 | * | 8/2003 | Wendorff et al. .......... 455/550 |
| 2004/0085289 | A1 | * | 5/2004 | Mak ........................... 345/156 |

FOREIGN PATENT DOCUMENTS

| EP | 1617630 |   | 1/2006 |
| GB | 2394381 A | * | 10/2003 |
| JP | 2004140434 A | * | 5/2004 |
| WO | WO 03/028346 |   | 4/2003 |

OTHER PUBLICATIONS

PCT International Search Report, International Application No. PCT/IB2004/001477, Mailed Apr. 21, 2006.

* cited by examiner

*Primary Examiner*—Tuan T. Dinh
*Assistant Examiner*—Hung S Bui
(74) *Attorney, Agent, or Firm*—Coats & Bennett, P.L.L.C.

(57) ABSTRACT

An electronic device has a main body, a flip attached to the main body and multiple input interfaces. A first input interface is disposed on the main body of the electronic device. Second and third input interfaces are disposed on apposing sides of the flip. The flip covers at least a part of the first input interface when the flip is in a closed position. The flip is rotatable so that either the second or third interface can be selectively used when the flip is in the closed position.

14 Claims, 4 Drawing Sheets

PORTABLE ELECTRONIC DEVICE WITH MULTIPLE INPUT INTERFACES

BACKGROUND OF THE INVENTION

The present invention relates generally to multi-function electronic devices and, more particularly, to input devices for multi-function electronic devices.

Portable electronic devices, such as cellular phones, personal digital assistants (PDAs), digital cameras, and audio players, are becoming increasingly popular among consumers. It is not uncommon for some people to have two or more such devices for different functions. The need to carry two or more devices to perform different functions is inconvenient for users. In response to consumer demands, manufacturers have begun marketing and selling electronic devices that combine functions normally performed by two or more separate devices into a single unit. By way of example, a number of manufacturers currently offer PDAs that also function as a wireless communication terminal. An example of a combined device is the Clie line of PDAs currently offered for sale by Sony. This type of combined device provides greater consumer convenience than single purpose devices. Further, because combined devices can use the same components for multiple functions, combined devices in general are less expensive than buying separate devices that perform the same functions.

One challenge in designing multi-function devices is providing convenient and easy-to-use input interfaces for a variety of different functions. An input device suitable for certain functions may be cumbersome for other functions. For example, a standard telephone keypad may be convenient for wireless communication functions, but does not make a good game controller. Data entry with a standard telephone keypad is also cumbersome. Accordingly, there is a need for electronic devices that provide multiple input interfaces for different functions.

SUMMARY OF THE INVENTION

The present invention relates to an electronic device having multiple input interfaces. In one embodiment of the invention, the electronic device comprises a main body, a reversible flip attached to the main body, a first input interface on the main body, a second input interface on a first side of the flip, and a third input interface on a second side of the flip. The first input interface may be positioned on the main body so that it is covered by the flip when the flip is in a closed position. Thus, either the second or third input interfaces are presented to the user when the flip is closed. The user opens the flip to access the first input interface.

In a preferred embodiment of the invention, the electronic device may have one or more global controls, such as keys, buttons, switches, or other controls, on the main body that are not covered by the flip when the flip is in the closed position. The global controls are always active regardless of the specific input interface currently in use. The global controls may, for example, enable the user to answer incoming calls or to place calls.

DETAILED DESCRIPTION OF THE INVENTION

Figure 1:
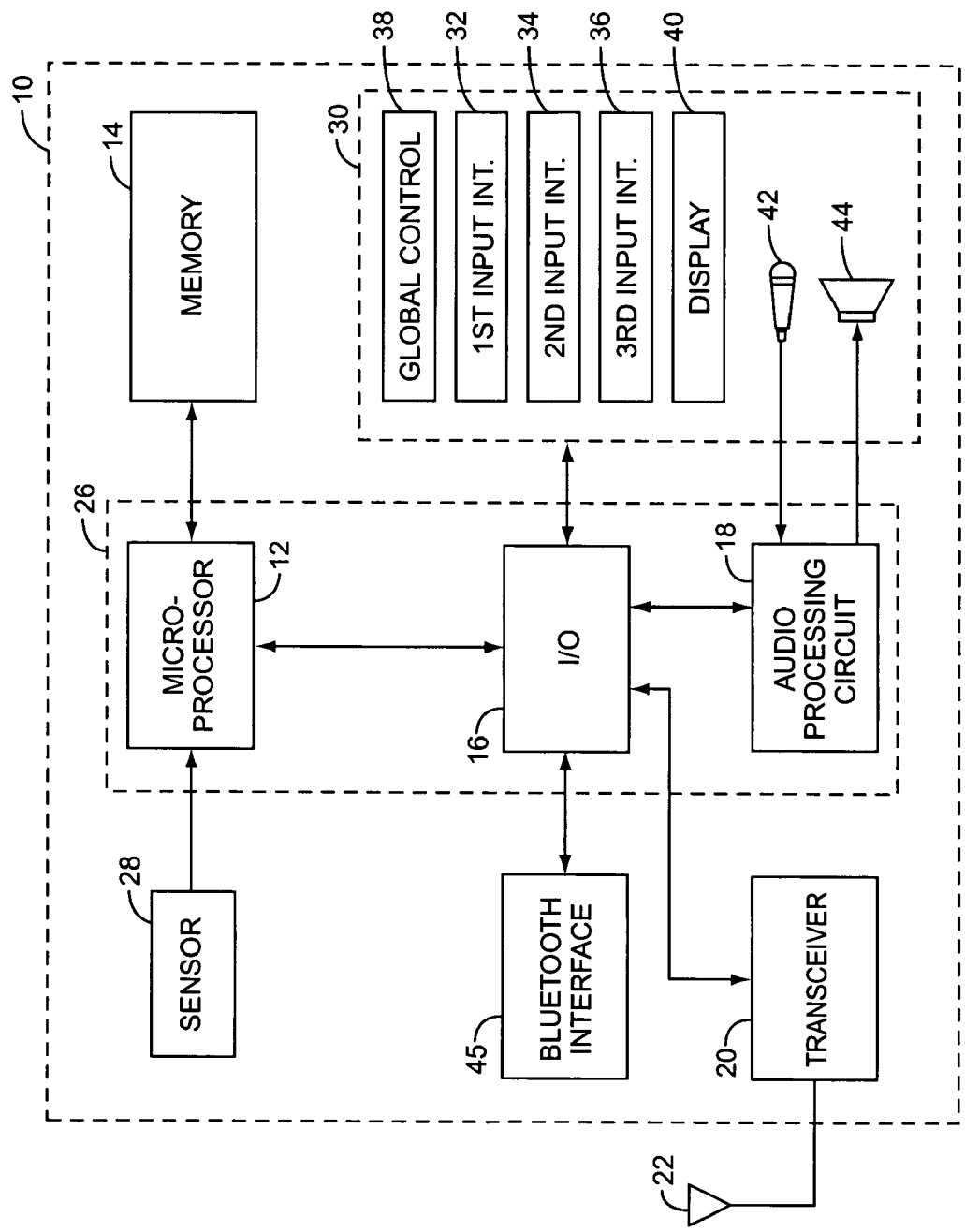
FIG. 1 is a functional block diagram of en electronic device according to the present invention.

Referring now to the drawings, exemplary embodiments of the present invention are shown. The exemplary embodiments combine a cellular telephone, personal digital assistant (PDA), and game apparatus into a single package. Two embodiments are disclosed and the same reference numbers are used in the description of both embodiments. The present invention is not limited to the specific embodiments shown, but may be embodied in countless other electronic devices FIG. 1 is a block diagram of the exemplary multi-function electronic device 10 according to the present invention. Electronic device 10 comprises microprocessor 12, memory 14, input/output circuit 16, audio processing circuit 18, transceiver 20, antenna 22, and user interface 30. Microprocessor 12 controls the operation of electronic device 10 according to programs stored in memory 14. The control functions may be implemented in a single microprocessor 12 or in multiple microprocessors. Suitable microprocessors may include, for example, both general purpose and special purpose microprocessors and digital signal processors. Memory 14 represents the entire hierarchy of memory in an electronic device 10, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 12. I/O circuits 16 interface the microprocessor 12 with audio processing circuit 18, transceiver 20, and user interface 30. Microprocessor 12, audio processing circuits 18, and input/output circuit 16 may be incorporated into a specially designed application-specific integrated circuit (ASIC) 26.

Transceiver 20 is coupled to an antenna 22 for receiving and transmitting signals. Transceiver 20 is a fully functional cellular radio transceiver, which may operate according to any known standard, including the standards known generally as the Global System for Electronics (GSM), TIA/EIA-136, cdmaOne, cdma2000, UMTS, and Wideband CDMA. Electronic device 10 may also include a short-range wireless interface 45, such as a BLUETOOTH™ interface, for communicating with nearby devices.

User interface 30 includes multiple input interfaces 32, 34, 36, global controls 38, display 40, microphone 42, and speaker 44. Input interfaces 32, 34, 36, global controls 38, and display 40 enable the user to interact with the electronic device 10. The multiple input interfaces 32, 34, 36 give the user a choice of input options for different functions. In the exemplary embodiment, the first input interface 32 comprises a keypad, the second input 34 interface comprises a game controller, and the third input interface 36 comprises a touch pad or other pressure sensitive interface. The first input interface 32 may be useful for communication functions. The second input interface 34 is useful for playing games. The third input interface 36, when used as part of a graphical user interface (GUI), is useful for many data entry and other computing functions.

In one embodiment of the invention, enablement of the first, second, and third input interfaces 32, 34, 36 is mutually exclusive. That is, only one input interface 32, 34, 36 is enabled at a given time. Some embodiments may allow more than one input interface 32, 34, 36 to be enabled simultaneously. The selection of input interfaces 32, 34, 36 in the case where only one is enabled at a given time is discussed in more detail below.

Figure 2:
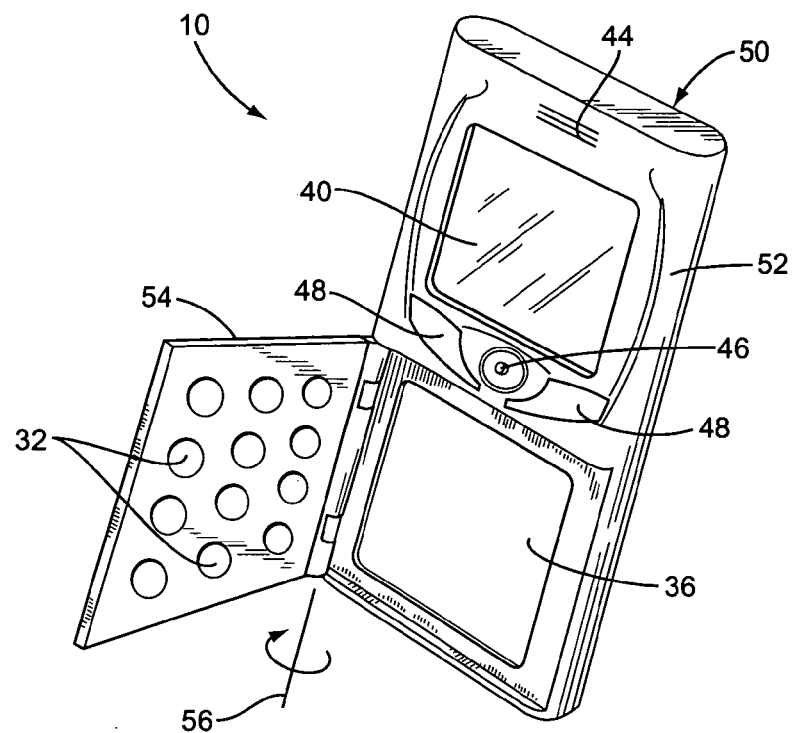
FIG. 2 is a perspective view of a first embodiment of the electronic device with the flip rotated about its first axis of rotation to an open position to reveal the first input interface.

The global controls 38 are always active regardless of the particular input interface 32, 34, 36 currently enabled. The global controls 38 provide basic controls for common functions, such as answering an incoming call. The global controls 38 may, for example, comprise a joystick control 46 with push-button functionality and a small number of global input keys 48 or pushbuttons as shown in FIG. 2. The joystick control 46 allows the user to navigate menus presented on the display 34 and make selections. The global keys 48 provide a convenient means of performing preprogrammed functions. The functions of the global input keys 48 may be context sensitive. Assume for example, that the user receives an incoming call while the user is playing a game. In this scenario, one of the global keys 48 could be programmed to answer the incoming call and suspend the game with the press of a single key.

Display 40 is preferably a high resolution, multi-line color display. Display 40 allows the user to see dialed numbers, status information, prompts, menus, and other information. Display 40 also allows the user to view text messages, images and graphics.

Microphone 42 converts the user's speech into electrical audio signals for transmission by the transceiver 20, and speaker 44 converts audio signals received by the transceiver 20 into audible signals that can be heard by the user. Audio processing circuit 18 provides basic analog output signals to speaker 44 and accepts analog audio inputs from microphone 42.

FIG. 2 is a perspective view of an electronic device of the present invention. The electronic device 10 has a housing 50 including a main body 52 and a flip 54. The flip 54 is pivotally attached to the main body 52 so as to rotate about two axes of rotation 56, 58. The flip 54 rotates about the first axis of rotation 56 (FIGS. 2 and 6) between open and closed positions. The flip 54 also rotates about the second axis of rotation 58 (FIGS. 4 and 6) through an angle of approximately 180 degrees. The second axis of rotation 58 is generally perpendicular to the first axis of rotation 56 and allows the flip 54 to swivel approximately 180 degrees so that either side of the flip 54 faces outward when the flip 54 is in the closed position.

The display 40 and global controls 38 are disposed on the front of the main body 52. The display 40 and global controls are positioned above the flip 54 so that the display 40 is visible and the global controls 38 are accessible even when the flip 54 is in the closed position. As noted above, the first and second input interfaces 32, 34 are disposed on opposing sides of the flip 54 so that either the first or second input interface 32, 34 faces outward when the flip 54 is in the closed position. The first input interface 34 may for example comprise a keypad. The second input interface 36 may comprises a game controller. The third input interface 32 may comprise a touch pad or other pressure sensitive interface in the exemplary embodiment. The third input interface 36 is preferably disposed on the front of the main body 52 and positioned to be at least partially concealed by the flip 54 when the flip 54 is in the closed position.

The particular location of each input interface 32, 34, 36 shown in the drawings is only one of many possibilities. The locations of each input interface 32, 34, 36 may be varied from that described above. For example, the first or second input interfaces 32, 34 could comprise a touchpad or other pressure sensitive interface. The third input interface 32 could comprise either a keypad, game controller, or other known type of input interface. The particular choice and arrangement of input interfaces 32, 34, 36 will be dictated to some extent by the functions of the electronic device 10 and user preferences.

As noted above, the user may select the input interface 32, 34, 36 in those embodiments where only one input interface 32, 34, 36 is enabled at a given time. One method of selecting the desired input interface 32, 34, 36 is by menu selection. In this case, the device may present a list of input options on display 40 from which the user may select the desired input interface 32, 34, 36. In other embodiments, the selection of the input interface may be determined by the position of the flip 54. The electronic device 10 may include a sensors 28 (FIG. 1) to detect the current position of the flip 54 and automatically enable one input interface 32, 34, 36 depending on the current position of the flip 54. Automatic selection of the input interface 32, 34, 36 may be more convenient for a user that uses many different functions and is constantly switching between functions. In the case of automatic selection, the user may be given the option of programming the device 10 to enable specific input interfaces for each distinct flip position.

Figure 3:
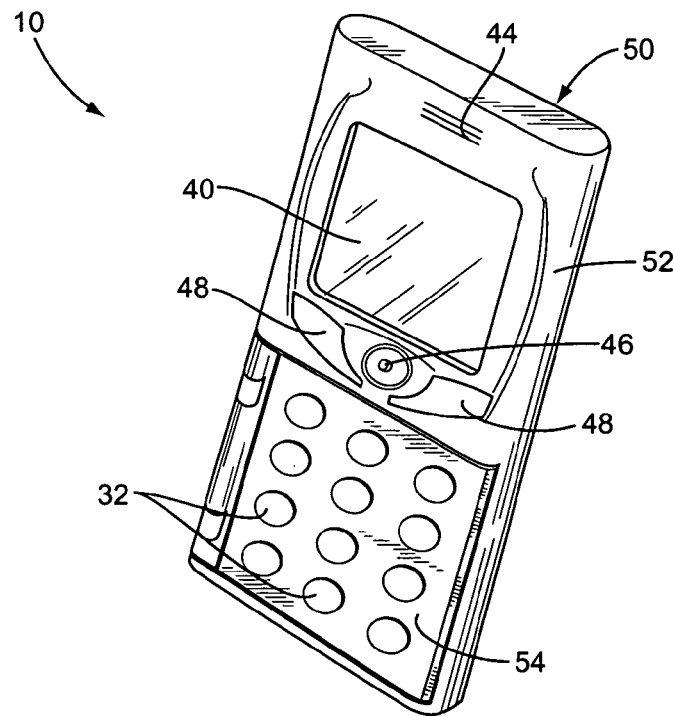
FIG. 3 is a perspective view of the first embodiment of the electronic device with the flip in a closed position and the second input interface facing outward.
Figure 4:
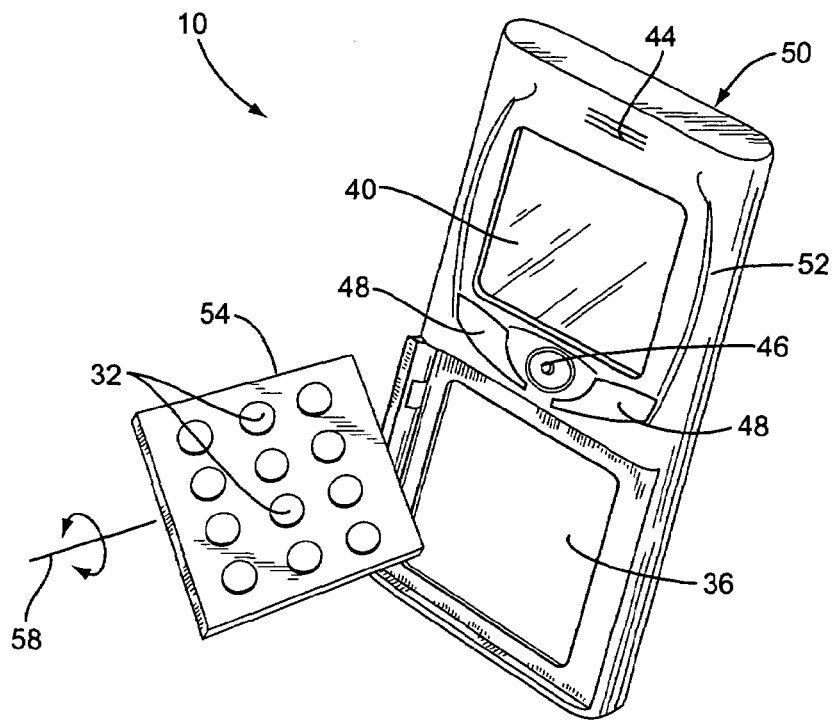
FIG. 4 is a perspective view of a first embodiment of the electronic device with the flip partially rotated about its second axis of rotation.
Figure 5:
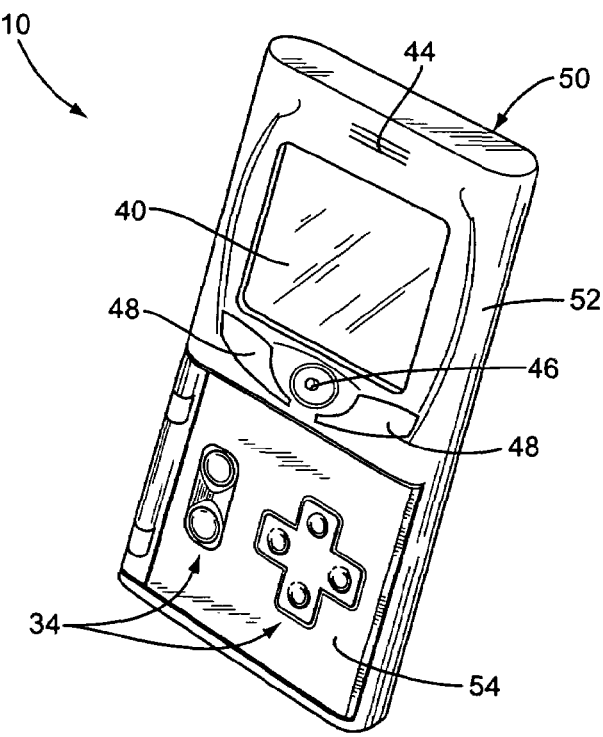
FIG. 5 is a perspective view of the first embodiment of the electronic device with the flip in a closed position and the third input interface facing outward.

FIGS. 2-5 illustrate the various positions of the flip 54 during use of the device 10. FIG. 2 illustrates the device 10 with the flip 54 in an open position. In this position, the user can use the third input interface 36. FIG. 3 illustrates the device 10 with the flip 54 in a closed position and the first input interface 32 facing outward. In this position the user can use the device 10 with the first input interface 32. FIG. 4 shows flip 54 being rotated about the second axis of rotation 58 so that the second input interface 34 will face outward when the flip 54 is closed. FIG. 5 illustrates the device 10 with the flip 54 in a closed position and the second input interface 34 facing outward. In this position the user can use the device 10 with the third second interface 34. The global controls 38 are accessible to the user in all three cases illustrated in FIGS. 2-5.

Figure 6:
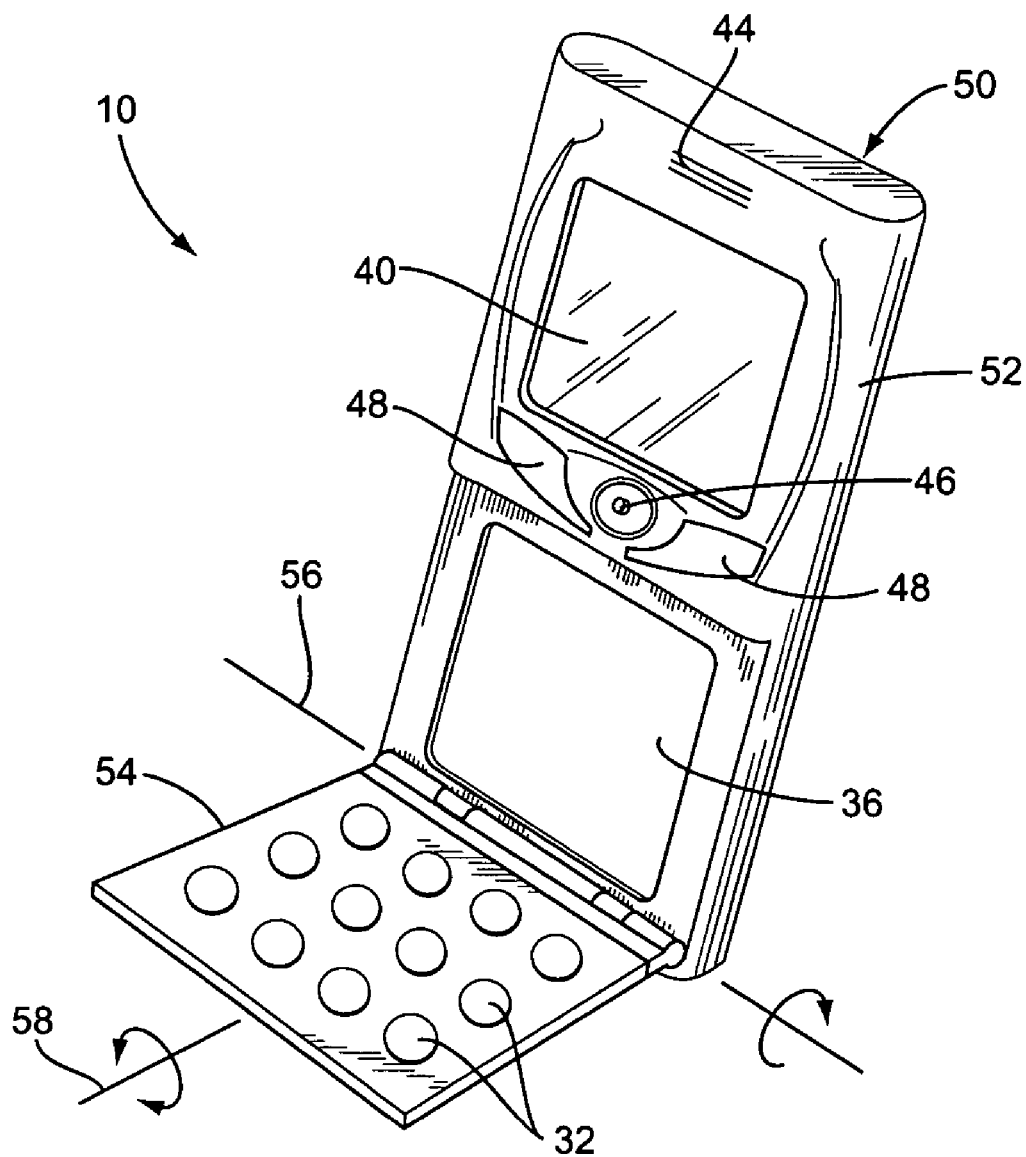
FIG. 6 is a perspective view of a second embodiment of the electronic device with the flip in an open position.

FIG. 6 illustrates an alternate embodiment of the electronic device 10 of the present invention. The second embodiment is the same as the first embodiment except that the flip 54 is hinged at the bottom of the main body 52 rather than at the side. The second embodiment may be useful, for example, when electronic device functions primarily as a mobile communication device.

What is claimed is:

1. An electronic device comprising:
   a main body;
   a flip having opposing sides attached to said main body, the flip being rotatable about a first axis of rotation between open and closed positions and rotatable about a second axis of rotation generally perpendicular to the first axis of rotation so that either one of the opposing sides of the flip faces outward when the flip is in the closed position;
   a first input interface on a first opposing side of the flip; and
   a second input interface on a second opposing side of the flip; and a third input interface on the main body positioned to be at least partially covered by the flip when the flip is in the closed position.

2. The electronic device of claim 1 further comprising a display on the main body and positioned such that the display is visible when the flip is in the closed position.

3. The electronic device of claim 1 wherein the first, second, and third input interfaces are selectively activated.

4. The electronic device of claim 3 wherein only one of the first, second, and third input interfaces is active at a time.

5. The electronic device of claim 3 wherein the first, second, and third input interfaces are selectively activated depending on the position of the flip.

6. The electronic device of claim 3 wherein the first, second, and third input interfaces are selectively activated by the user.

7. The electronic device of claim 3 further comprising one or more global controls on the main body and positioned such that the global controls are accessible when the flip is in the closed position.

8. The electronic device of claim 7 wherein the global controls are active with each of the first, second, and third input interfaces.

9. The electronic device of claim 7 wherein the global controls include a joystick control.

10. The electronic device of claim 7 wherein the global controls include one or more global input keys.

11. The electronic device of claim 1 wherein the first input interface comprises a keypad having a plurality of input keys.

12. The electronic device of claim 1 wherein the second input interface comprises a game controller.

13. The electronic device of claim 1 wherein the third input interface comprises a pressure sensitive interface.

14. The electronic device of claim 13 wherein the touch sensitive interface comprises a touch pad.

* * * * *